Patented Dec. 26, 1950

2,535,551

UNITED STATES PATENT OFFICE 2,535,551

PREPARATION OF SUBSTANTIALLY PURE AMMONIUM CHLOROIRIDITE SOLUTION

Alan Richardson Raper and Samuel John Rimington Fothergill, London, England, assignors to The International Nickel Company, Inc., New York, N. Y., a corporation of Delaware No Drawing. Application October 4, 1948, Serial No. 52,782. In Great Britain October 6, 1947

6 Claims. (Cl. 23—87)

In the course of refining iridium it is customary to separate the metal from solution as the insoluble salt ammonium chloroiridate $(NH_4)_2[IrCl_6]$. Iridium is obtained by the thermal decomposition of this salt. If iridium of a high degree of purity is required, base metals such as lead and other metals of the platinum group, particularly rhodium, ruthenium and platinum, must be removed from the impure salt before the thermal decomposition, and it is known that this can be done by precipitating them as sulphides. In the known processes an acidified solution of the chloride $H_3[IrCl_6]$ is kept saturated with hydrogen sulphide for a long period. The yield of pure iridium obtained by this process is poor, and even though this may be increased by converting the chloride to its sodium salt $Na_3[IrCl_6]$ and carefully controlling the acidity of a solution of this salt during treatment with hydrogen sulphide the process remains cumbersome and lengthy on a large scale.

According to this invention impure ammonium chloroiridate $(NH_4)_2[IrCl_6]$ is dissolved in water in the presence of a reducing agent to provide a solution of ammonium chloroiridite $(NH_4)_3[IrCl_6]$ and the impurities are removed from the solution by fractional precipitation with an ammonium or alkali metal sulphide, hydrosulphide, polysulphide or thiosulphate. This process can be controlled more easily than one in which hydrogen sulphide is continuousssly bubbled through a solution, and it enables iridium of very great purity to be obtained in a good yield.

The reducing agent used to allow the initial insoluble chloride to enter solution as the soluble chloride may be the same as the precipitating agent, or any other reducing agent may be used, e. g. sodium nitrite or an ammonium or alkali metal formate. It is, however, convenient to use ammonium sulphide as the reducing agent in an amount sufficient to convert all the initial chloride to soluble ammonium chloroiridite. The following empirical, chemical equation illustrates the mechanism of the reduction of insoluble ammonium chloroiridate, wherein the iridium has a valency of 4, to soluble ammonium chloroiridite, wherein the iridium has a valency of 3:

$$2(NH_4)_2[IrCl_6] + (NH_4)_2S \rightarrow 2(NH_4)_3[IrCl_6] + S$$

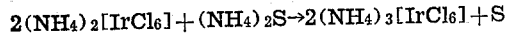

Then in subsequent steps small amounts of ammonium sulphide may be added as a precipitating agent, the solution may be heated to 70° C. or higher temperature and cooled, and precipitated sulphides may be removed by filtration. During the process the solution is within the pH range 1 to 3, this being less strongly acid than in known processes using hydrogen sulphide.

The process may be continued until a test made on a portion of the solution shows that the impurities have been removed to the required extent. If for instance iridium is being produced to a standard of purity of 99.9 per cent and the original salt is reasonably pure, it may only be necessary to give the solution four treatments with small amounts of ammonium sulphide. If, however, it is required to produce iridium of the highest degree of purity, that is to say, iridium which gives no sign of impurities on being examined spectrographically, then a much more extended purification must be carried out. Initially impurities can be present to a total extent up to about 10%, these including platinum, rhodium and ruthenium. Lead, iron and copper may also be present to an extent of about 1%. If much platinum is present it is preferable to remove it first by some known other method.

As an example the production of spectrographically pure iridium may be given: 1 kilogram of commercially pure ammonium chloroiridate (41.9 per cent iridium content) was charged into a large silica bowl with the addition of 5.0 litres of hot distilled water. The salt was brought into solution as ammonium chloroiridite by the gradual addition of 400 ccs. of 16 per cent ammonium sulphide solution. The solution was boiled for one hour, cooled and filtered. About 9 grams of sulphide residue were separated on filtration. The solution was now treated with 25 ccs. of 16 per cent ammonium sulphide solution, heated to boiling and then allowed to cool. 9 grams of sulphide precipitate were filtered off. This operation was repeated a further six times, 25 ccs. of ammonium sulphide being added on each occasion. On the average approximately 8 grams of sulphide precipitate were filtered off at each fractional precipitation of impurities. At this stage of refining the bulk of the iridium was recovered from solution as ammonium chloroiridate by oxidation with 300 ccs. of pure nitric acid followed by the addition of 200 grams of ammonium chloride. Oxidation was effected by boiling for a period of 4 hours. The iridium salt was filtered off and washed with ammonium chloride solution.

A specimen of the chloride was ignited to metal and on spectrographic examination was found to contain traces of rhodium, palladium and lead. The purification was accordingly continued with the use of very pure reagents. Specifically 0.880 kg. of ammonium chloroiridate from the preliminary purification were dissolved in 7.5 litres of hot distilled water with the addition of 350 ccs. of ammonium sulphide solution. After boiling, cooling and filtering 28 grams of sulphide residue were removed. The solution was now treated three times with 25 ccs. of ammonium sulphide solution. On each occasion the solution was boiled, allowed to cool and then filtered. About 4 grams of sulphide precipitate were removed by filtration at each stage. The solution was next oxidised by boiling for 4½ hours with 300 ccs. nitric acid, followed by the addition of 200 grams of ammonium chloride. The pure ammonium chloroiridate was filtered off and washed with ammonium chloride solution.

Spectrographic examination of the iridium from a sample of the iridium salt ignited to metal gave the following results:

Rhodium—not detected (less than 0.001%)
Platinum—not detected (less than 0.001%)
Palladium—not detected (much less than 0.001%)
Lead—not detected (less than 0.0001%)

In order to obtain the metal, the pure ammonium chloroiridate was placed in a deep silica tray and covered with a shallow silica tray. The covered tray was put in a muffle furnace and hydrogen passed into it. The muffle furnace was then heated gradually to a temperature of 700° C. and maintained at this temperature for 30 minutes. The hydrogen atmosphere was maintained in the tray during the whole period of thermal decomposition of the iridium salt and during the cooling period. The iridium was next treated with hydrofluoric acid to remove silica. Thereafter, final purification was effected by successive treatments with dilute aqua regia and dilute nitric acid, and the iridium metal was finally ignited at 500–600° C. in a hydrogen atmosphere for two hours. The yield of spectrographically pure iridium metal was 0.318 kilogram; i. e. 76 per cent.

An example of the production on a larger scale of commercially pure iridium may also be given: 16,383 kgms. of impure ammonium chloroiridate, containing 0.4% platinum, 1.0% rhodium, 1.6% ruthenium and 36.5% iridium was charged into silica bowls with the addition of 90 litres of water. The salt was brought into solution as ammonium chloroiridate by the gradual addition of 6.54 litres of 16% ammonium sulphide solution. The solution was heated to 70° C. cooled and the ammonium sulphide residue was filtered off. The solution was now treated with 0.42 litre of 16% ammonium sulphide solution, heated to 70° C., cooled and the ammonium sulphide precipitate filtered off. This last operation was repeated using a further 0.42 litre of 16% ammonium sulphide solution. The total weight of ignited ammonium sulphide residues obtained from these operation was 0.977 kgm. The iridium content of these residues was 10.75% of the iridium present in the original impure ammonium chloroiridate. At this stage the bulk of the iridium was recovered from solution as ammonium chloroiridate by oxidation with 5.46 litres of pure nitric acid, followed by the addition of 14.84 litres of 22.5% ammonium chloride solution. Oxidation was effected by boiling for a period of 3½ hours. The iridium salt was filtered off and washed with half saturated ammonium chloride solution. 12.532 kgms. of ammonium chloroiridate was obtained containing 0.1% rhodium, 0.1% ruthenium and 42.5% iridium. The amount of iridium contained in this salt was 89.22% of the iridium present in the original impure ammonium chloroiridate.

The purification was continued by dissolving 12.512 kgms. of ammonium chloroiridate, containing 0.1% rhodium and 0.1% ruthenium, in 72 litres of water with the addition of 5.04 litres of 16% ammonium sulphide solution. After heating to 70° C. and cooling the ammonium sulphide residue was filtered off. The solution was now treated twice with 0.32 litre of 16% ammonium sulphide solution. On each occasion the solution was heated to 70° C., cooled and then filtered. The total weight of ignited ammonium sulphide residues was 0.422 kgm. and the iridium content was 6.73% of the iridium present in the original impure ammonium chloroiridate. The bulk of the iridium present in solution was recovered by oxidation with 4.18 litres of pure nitric acid followed by the addition of 11.2 litres of 22.5% ammonium chloride solution. Oxidation was effected by boiling for a period of 4 hours. The pure salt was filtered off and washed with half saturated ammonium chloride solution. 11.498 kgms. of pure ammonium chloroiridate was obtained containing 42.8% iridium. The ammonium chloroiridate was converted to metal in the manner described in the preceding example. The yield of iridium was 82.44% of that contained in the original impure salt.

Spectrographic analysis of a sample of the metal gave the following results:

Rhodium—present (0.001%)
Platinum—present (less than 0.001%)
Palladium—present (less than 0.001%)
Lead—present (less than 0.0001%)

We claim:

1. In a process for producing a substantially pure solution of ammonium chloroiridite from impure ammonium chloroiridate from which substantially pure iridium may be recovered, the improvement which comprises reducing impure ammonium chloroiridate in the presence of water with at least one reducing agent from the group consisting of the sulfides, hydrosulfides, polysulfides, thiosulfates, and formates of ammonium and of the alkali metals and the alkali metal nitrites to produce an aqueous solution of ammonium chloroiridite containing metallic impurities and having a pH between about 1 and about 3; thereafter fractionally precipitating the metallic impurities from said solution by adding at least one precipitating agent from the group consisting of the sulfides, hydrosulfides, polysulfides and thiosulfates of ammonium and of the alkali metals to said solution while maintaining said solution at a pH between about 1 and about 3 to produce an ammonium chloroiridite solution substantially devoid of metallic impurities from which substantially pure iridium may be recovered.

2. A process according to claim 1 wherein the metallic impurities contained in the aqueous acid solution of ammonium chloroiridite by fractional precipitation with at least one precipitating agent from the group consisting of the sulfides, hydrosulfides, polysulfides, the thiosulfates of ammonium and the alkali metals while heating said solution to a temperature between about 70° C. and the boiling point of said ammonium chloroiridite solution.

3. A process according to claim 1 in which the reducing agent is ammonium sulfide and the precipitating agent is ammonium sulfide.

4. A process according to claim 1 in which the reducing agent is sodium sulfide and the precipitating agent is sodium sulfide.

5. A process according to claim 1 in which the reducing agent is sodium thiosulfate and the precipitating agent is sodium thiosulfate.

6. In a process for producing a substantially pure solution of ammonium chloroiridite from impure ammonium chloroiridate from which substantially pure iridium may be recovered, the improvement which comprises reducing impure ammonium chloroiridate in the presence of water to produce an aqueous, acid solution of ammonium chloroiridite containing metallic impurities; while maintaining said solution at a pH between about 1 and about 3, precipitating the metallic impurities from said solution with at least one precipitating agent from the group consisting of the sulfides, hydrosulfides, polysulfides and thiosulfates of ammonium and of the alkali metals; and separating the precipitated metallic impurities from said solution to produce an ammonium chloroiridite solution substantially devoid of metallic impurities from which substantially pure iridium may be recovered.

ALAN RICHARDSON RAPER.
SAMUEL JOHN RIMINGTON FOTHERGILL.

REFERENCES CITED

The following references are of record in the file of this patent:

"Analytical Chemistry," vol. I, 1930 ed., page 183, by Treadwell and Hall. John Wiley & Sons, Inc., N. Y., publishers.

"A Comprehensive Treatise on Inorganic and Theoretical Chemistry," by J. W. Mellor, vol. XV, 1936 ed., pages 769 and 770. Longmans, Green & Co., N. Y., publishers.

"A Course in General Chemistry," by McPherson and Henderson, page 278, 3rd ed. Ginn & Co., N. Y., publishers.

"Qual. Chem. Analysis," Prescott and Johnson, 1901 ed., pages 132–133.

Certificate of Correction

Patent No. 2,535,551 December 26, 1950

ALAN RICHARDSON RAPER ET AL.

It is hereby certified that error appears in the printed specification of the above numbered patent requiring correction as follows:

Column 1, line 31, for "continuoussly" read *continuously*; column 3, line 50, for "chloroiridate" read *chloroiridite*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*